US008397485B2

(12) United States Patent
Wood et al.

(10) Patent No.: US 8,397,485 B2
(45) Date of Patent: Mar. 19, 2013

(54) MORPHING STRUCTURE AND METHOD (75) Inventors: Jeffrey H. Wood, Eureka, MO (US);
James P. Dunne, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/404,621

(22) Filed: Feb. 24, 2012

(65) Prior Publication Data

US 2012/0151899 A1 Jun. 21, 2012

Related U.S. Application Data (62) Division of application No. 12/568,195, filed on Sep. 28, 2009, now Pat. No. 8,186,143, which is a division of application No. 12/025,872, filed on Feb. 5, 2008, now Pat. No. 7,644,575, which is a division of application No. 10/988,287, filed on Nov. 12, 2004, now Pat. No. 7,340,883.

(51) Int. Cl.
*F02K 1/38* (2006.01)
(52) U.S. Cl. .............................. 60/204; 60/226.1; 60/771
(58) Field of Classification Search .................... 60/204, 60/226.1, 771; 239/265.33, 265.43
See application file for complete search history.

(56) References Cited

U.S. PATENT DOCUMENTS

| 3,836,099 | A | 9/1974 | O'Neill et al. |
| 4,279,382 | A | 7/1981 | Wilson, Jr. |
| 5,150,864 | A | 9/1992 | Roglin et al. |
| 5,261,227 | A | 11/1993 | Giffin, III |
| 5,804,276 | A | 9/1998 | Jacobs et al. |
| 6,009,669 | A | 1/2000 | Jardine et al. |
| 6,108,978 | A | 8/2000 | Jeong |
| 6,318,070 | B1 | 11/2001 | Rey et al. |
| 6,499,952 | B1 | 12/2002 | Jacot et al. |
| 6,543,224 | B1 | 4/2003 | Barooah |
| 6,655,218 | B1 | 12/2003 | Ogisu et al. |
| 6,718,752 | B2 | 4/2004 | Nesbitt et al. |
| 6,813,877 | B2 | 11/2004 | Birch et al. |
| 7,093,423 | B2 | 8/2006 | Gowda et al. |
| 7,216,831 | B2 | 5/2007 | Wood |
| 7,340,883 | B2 | 3/2008 | Wood et al. |
| 7,644,575 | B2 | 1/2010 | Wood et al. |
| 2002/0125340 | A1 | 9/2002 | Birch et al. |
| 2003/0180567 | A1 | 9/2003 | Dunne et al. |

FOREIGN PATENT DOCUMENTS

| EP | 1 130 243 A2 | 3/2001 |
| GB | 766 985 A | 7/1952 |
| GB | 750 307 A | 6/1956 |
| GB | 859 994 A | 6/1958 |
| GB | 885 093 A | 5/1959 |

(Continued)

OTHER PUBLICATIONS

Calkins, F. T. and Butler, G. W., "Subsonic Jet Noise Reduction Variable Geometry Chevron," Jan. 3-8, 2004, pp. 1-12.

(Continued)

*Primary Examiner* — William H Rodriguez
*Assistant Examiner* — Lorne Meade
(74) *Attorney, Agent, or Firm* — Harness, Dickey & Pierce, P.L.C.

(57) ABSTRACT

A method of controlling mixing of a flow exiting a downstream end of a primary nozzle associated with a jet engine. The method may involve coupling a shape memory alloy (SMA) element to a mixing structure disposed at the downstream edge of the primary nozzle. An electrical signal may be applied to the SMA element to heat the SMA element and induce a phase change in the SMA element. The phase change may cause an axial length of the SMA element to constrict, to cause movement of the mixing structure into a path of the flow exiting the primary nozzle.

17 Claims, 8 Drawing Sheets

FOREIGN PATENT DOCUMENTS

| | | | |
|---|---|---|---|
| GB | 859 993 | A | 1/1961 |
| GB | 910 250 | A | 5/1961 |
| GB | 1 116 639 | A | 11/1964 |
| GB | 2 031 523 | A | 6/1979 |
| GB | 2 372 779 | A | 4/2002 |
| JP | 07-237599 | | 9/1995 |

OTHER PUBLICATIONS

Mabe, James H. et al., "Morphing Chevrons for Take Off and Cruise Noise Reduction," Sep. 20-22, 2004, pp. 1-12.

Rey, N. M. et al., "Shape Memory Alloy Actuation for a Variable Area Fan Nozzle," Proceedings of the SPIE, SPIE, Bellingham, VA, US, vol. 4332, Mar. 5, 2001, 12 pages, 371-382.

MORPHING STRUCTURE AND METHOD

CROSS-REFERENCE TO RELATED APPLICATIONS

This application is a divisional of U.S. application Ser. No. 12/568,195, filed Sep. 28, 2009 (now U.S. Pat. No. 8,186, 143), which is a divisional of U.S. application Ser. No. 12/025,872, filed Feb. 5, 2008 (now U.S. Pat. No. 7,644,575), which is a divisional of U.S. application Ser. No. 10/988,287, filed Nov. 12, 2004 (now U.S. Pat. No. 7,340,883). The disclosure of each of the above applications is incorporated herein by reference.

FIELD

The present disclosure relates to structures that are adapted to change shape or position for operational purposes. More particularly, the present disclosure relates to structures configured to alter shape or position without the use of electric or hydraulic actuators to pivotally rotate hinged components.

BACKGROUND OF THE DISCLOSURE

There is a growing desire in the design of various structures to have structures that can change shape or position without the use of bulky mechanical devices. For example, in mobile platform design, e.g. aircraft, automobiles, trains and ships, to have structures that can change shape or position while the mobile platform is in operation. Such shape or positional changes are often desirable to meet fluctuating aerodynamic needs throughout the duration of mobile platform's travel. Typically, such dynamic shaping is performed through specific control structures such as flaps, spoilers, ailerons, elevators, rudders, etc. These structures are normally rigid structures that are hinged and pivotally actuated utilizing complex kinematic mechanisms driven by bulky electric or hydraulic actuators. Typically, such kinematic mechanisms and actuators are located either on an exterior surface of the structure or within internal cavities of the structure.

However, it is often desirable to dynamically alter the shape or position of structures that can not internally or externally accommodate such kinematic mechanisms and the actuators that drive them. For example, with present day jet aircraft, structures typically known in the industry as "chevrons" have been used to help in suppressing noise generated by a jet engine. The chevrons have traditionally been fixed (i.e., immovable), triangular, tab-like elements disposed along a trailing edge of a jet engine bypass and/or core nacelles such that they project into and interact with the exiting flow streams. Although the chevrons have been shown useful to attenuate noise, since they interact directly with the flow streams generated by the engine, the chevrons also generate drag and loss of thrust. Consequently, it would be desirable to have the chevrons deploy into the flow streams when noise reduction is a concern and then return or move to a non-deployed position when reduction of drag is a concern. Due to the aerodynamics necessities and extreme operational conditions associated with the engine nacelle and chevrons, kinematic mechanisms and the related actuators that would be needed to deploy the chevrons can not be located on external surfaces of the nacelle and chevrons. Furthermore, neither the nacelle structure nor the chevron structures provide adequate internal space to accommodate such kinematic mechanisms and actuators.

BRIEF SUMMARY

In one aspect the present disclosure relates to a method of controlling mixing of a flow exiting a downstream end of a primary nozzle associated with a jet engine. The method may comprise coupling a shape memory alloy (SMA) element to a mixing structure disposed at the downstream edge of the primary nozzle. An electrical signal may be applied to the SMA element to heat the SMA element and induce a phase change in the SMA element. The phase change may cause an axial length of the SMA element to constrict, to cause movement of the mixing structure into a path of the flow exiting the primary nozzle.

In another aspect the present disclosure relates to a method of controlling mixing of a flow exiting a downstream end of a primary nozzle associated with a jet engine. The method may comprise coupling a shape memory alloy (SMA) element to a mixing structure disposed at the downstream edge of said primary nozzle. A signal may be applied to the SMA element that causes a phase change in the SMA element, thus changing its axial length. The change in axial length of the SMA element may be used to pivot the mixing structure into a path of the flow exiting the primary nozzle.

In still another aspect the present disclosure relates to a method of controlling mixing of a flow exiting a downstream end of a primary nozzle associated with a jet engine. The method may comprise coupling a shape memory alloy (SMA) element to a mixing structure disposed at the downstream edge of said primary nozzle. A signal may be applied to the SMA element that causes a phase change in the SMA element, thus changing a dimensional property of the SMA element. The change in dimensional property of the SMA element may be used to flex the mixing structure into a path of the flow exiting the primary nozzle.

Further areas of applicability of the present disclosure will become apparent from the detailed description provided hereinafter. It should be understood that the detailed description and specific examples, while indicating the various embodiments of the disclosure, are intended for purposes of illustration only and are not intended to limit the scope of the disclosure. Furthermore, the features, functions, and advantages of the present disclosure can be achieved independently in various embodiments of the present disclosure or may be combined in yet other embodiments.

BRIEF DESCRIPTION OF THE DRAWINGS

The present disclosure will become more fully understood from the detailed description and accompanying drawings, wherein.

Corresponding reference numerals indicate corresponding parts throughout the several views of drawings.

DETAILED DESCRIPTION

The following description of the various embodiments is merely exemplary in nature and is in no way intended to limit the disclosure, its application or uses. Additionally, the advantages provided by the various embodiments, as described below, are exemplary in nature and not all embodiments provide the same advantages or the same degree of advantages.

Figure 1:
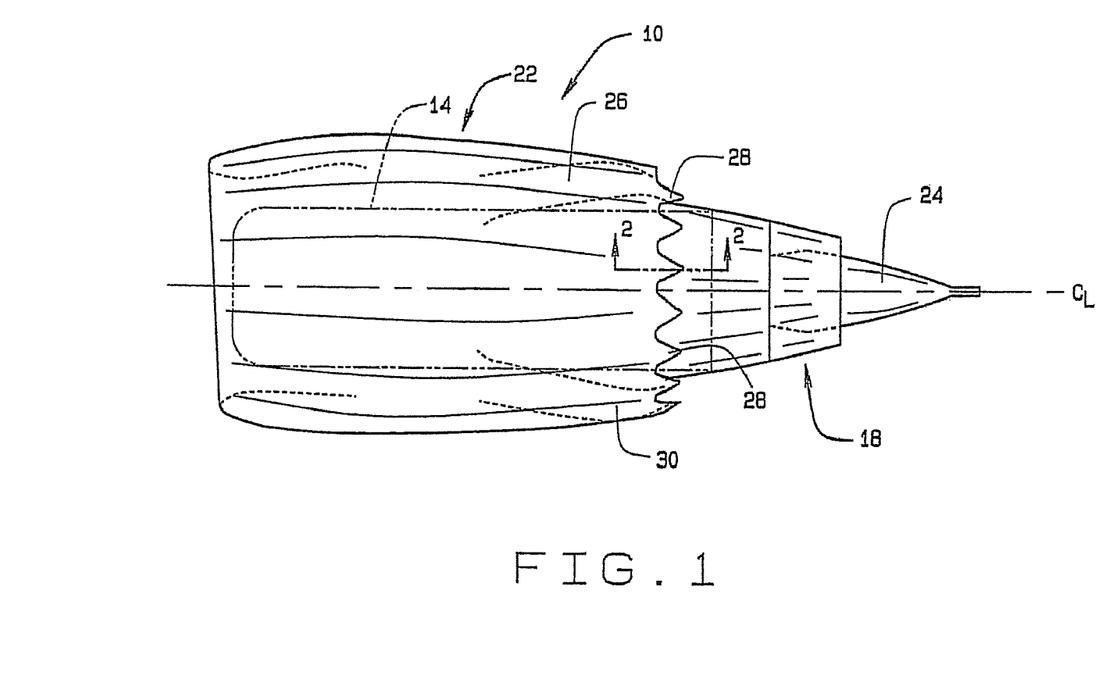
FIG. 1 is a simplified side view of a nacelle for housing a jet engine of an aircraft, with the nacelle incorporating a plurality of appending structures of the present disclosure along a trailing circumferential lip portion of a secondary flow nozzle of the nacelle.

FIG. 1, illustrates an exemplary structure 10, shown as a jet engine nacelle, in accordance with various embodiments of the present disclosure. Although the structure 10 and associated features and components will be described herein with respect to a jet engine nacelle, it should be understood that the present disclosure is applicable to any structure configured to change shape, form or position, and that the specific references herein to the jet engine nacelle are merely exemplary. For example, the present disclosure could be applicable to environmental control system air flow structures, automotive fuel and drive chain structures, or control structures for mobile platforms, e.g. flaps, spoilers, ailerons, elevators and rudders.

The nacelle 10 houses a jet engine 14 and includes a primary flow nozzle 18, also referred to in the art as a core exhaust nozzle. The primary flow nozzle 18 channels an exhaust flow from a turbine (not shown) of the engine 14 out the aft end of the nacelle 10. The nacelle 10 additionally includes a secondary flow nozzle 22, also referred to in the art as a bypass fan exhaust nozzle, that directs the exhaust flow from an engine bypass fan (not shown) out of the aft end of the nacelle 10. A plug 24 is disposed within the nacelle 10. In various embodiments, the secondary flow nozzle 22 includes a main body 26 and a plurality of mixing appending structures 28 (hereinafter simply the "appending structures 28"). The appending structures 28 are deployable to extend from a circumferential lip area 30, i.e. end portion, of the main body 26. The appending structures 28, commonly referred to in the art as "chevrons", extend into a flow stream emitted from the secondary flow nozzle 22, i.e. by-pass fan exhaust flow, to alter the exhaust flow. Therefore, the appending structures 28 may also be referred to herein as exhaust mixing structures and/or flow altering structures. By altering the exhaust flow, the appending structures 28 create an intermixing of the exhaust flow with the ambient air flowing adjacent the nacelle 10 and the appending structures 28. The intermixing of the exhaust flow and the ambient air flow attenuates the noise generated by the engine 14.

Figure 2:
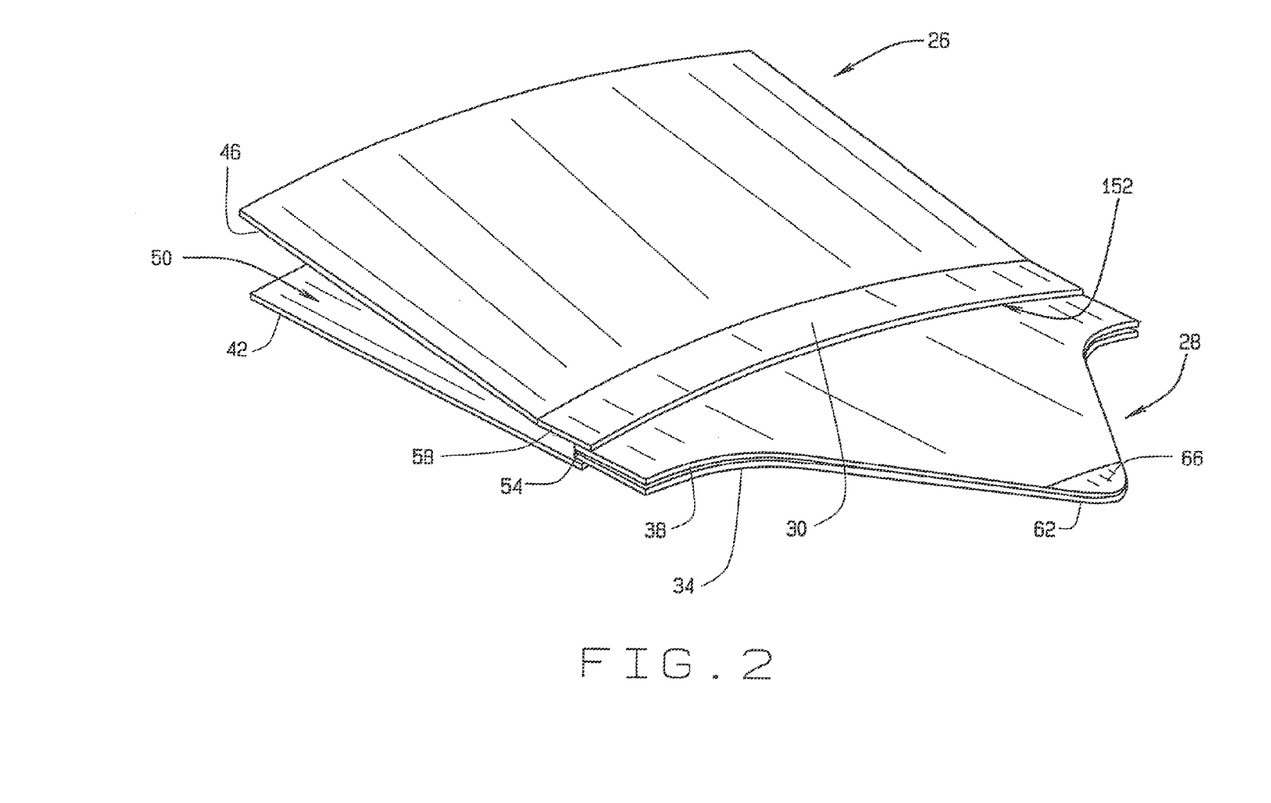
FIG. 2 is an isometric view of a portion of a main body of the nacelle secondary nozzle shown in FIG. 1, having one of the plurality of appending structures attached to the lip portion, in accordance with various embodiments of the present disclosure.

Referring to FIG. 2, a portion of the nacelle secondary flow nozzle body 26 is illustrated having one of the appending structures 28 attached to the lip area 30 of the nacelle secondary flow nozzle body 26. More specifically, each appending structure 28 includes an inner skin 34 and an outer skin 38. Preferably, the appending structure outer skin is constructed of any metallic or composite material suitable for the construction of jet engine nacelles, such as aluminum or carbon fiber. The secondary flow nozzle main body 26 includes an inner wall 42 and an outer wall 46 separated by cavity or gap 50. A proximal end 54 of the appending structure inner skin 34 is moveably positioned between the inner and outer body walls 42 and 46, within the cavity 50. A proximal end 58 of the appending structure outer skin 38 is fixedly coupled to the lip portion 30 of the body outer wall 46. A distal end portion 62 of the appending structure inner skin 34 is joined to a distal end portion 66 of the appending structure outer skin 38. The distal end portions 62 and 66 can be joined together using any suitable fastening means, such as screws, rivets, welding or diffusion bonding.

Figure 3:
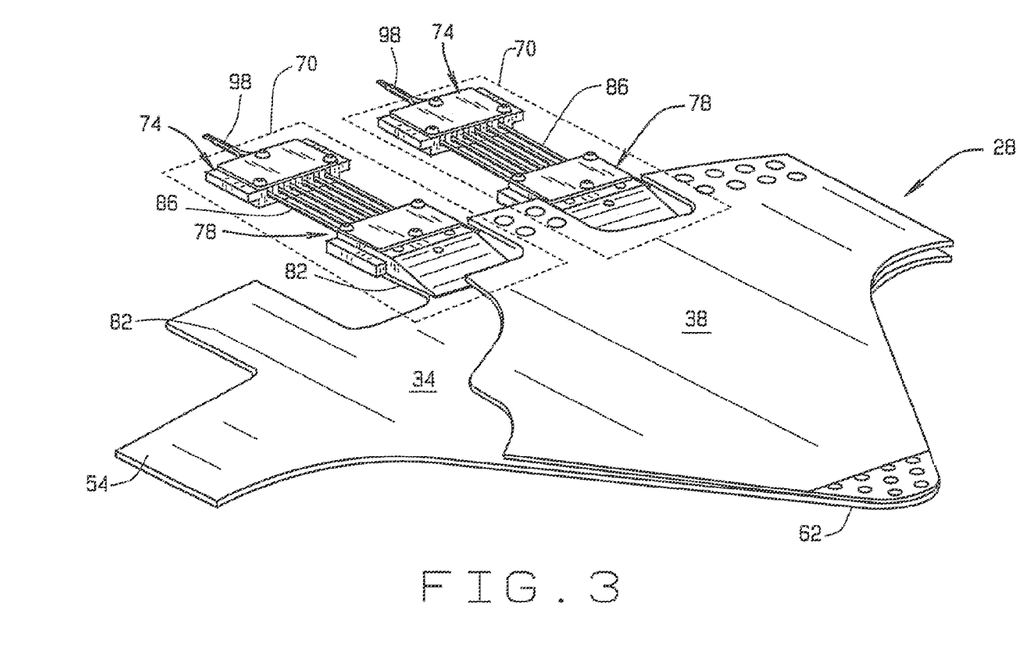
FIG. 3 is an isometric view of one of the plurality of appending structures shown in FIG. 1, having a section of an outer skin cut away to illustrate at least one actuator, in accordance with a various embodiment of the present disclosure.
Figure 4:
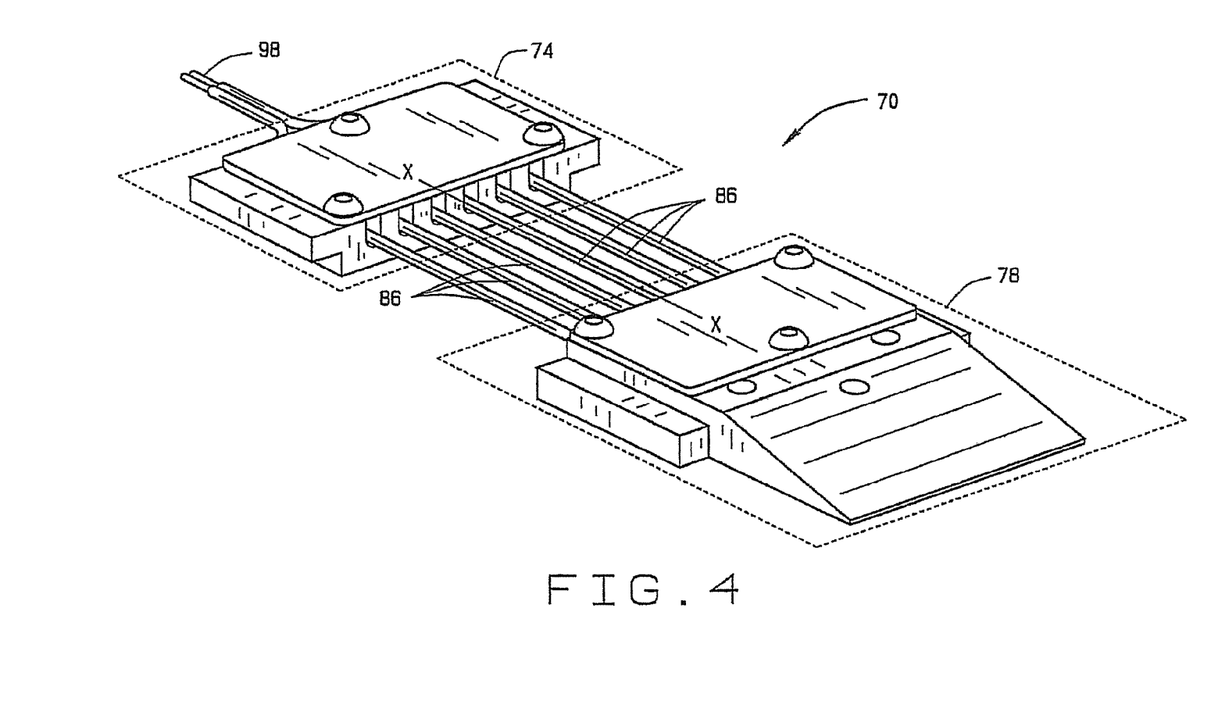
FIG. 4 is an isometric view of the actuator shown in FIG. 3.

Referring now to FIGS. 3 and 4, a plurality of actuators 70 are located within the cavity 50 and attached to the appending structures 28 and the main body 26 of the secondary flow nozzle 22. Each appending structure 28 has at least one actuator 70, preferably a plurality of actuators 70, attached thereto. More specifically, each actuator 70 includes a fixed pulling bracket 74 affixed to an internal side, i.e. the side adjacent and facing the cavity 50, of the main body inner wall 42. The fixed pulling bracket can be fixedly attached to the interior side of the inner wall 42 using any suitable fastening means, for example rivets, by welding, or any other suitable securing means.

Each actuator additionally includes a sliding pulling bracket 78 affixed to an internal side of a tab 82 extending from the proximal end 54 of the appending structure inner skin 34. Accordingly, if more than one actuator 70 is affixed to each appending structure inner skin 34, each inner skin 34 would include a plurality of tabs 82 such that each sliding bracket 78 is affixed to a separate independent tab 82.

Furthermore, each actuator 70 includes at least one shape memory alloy (SMA) tendon 86 connected to and extending between the fixed and sliding pulling brackets 74 and 78. In various embodiments, each actuator includes a plurality of the SMA tendons 86. The number of actuators 70 and SMA tendons 86 utilized is based on the particular application, e.g. a desired amount of appending structure upper skin deflection and a desired amount of force generated when the SMA tendons are activated. In various forms, the SMA tendons 86 are wires or cables constructed of any suitable SMA metal, for example, a nickel-titanium alloy such as a NITINOL® shape memory alloy. However, the SMA tendons 86 could have any form suitable such that when activated, i.e. heated, each SMA tendon 86 constricts in a one-dimensional direction along a longitudinal centerline, or axis, X (FIG. 4) of the respective SMA tendon 86. For example, the SMA tendons 86 could be long narrow flat strips of a SMA metal.

Figure 5:
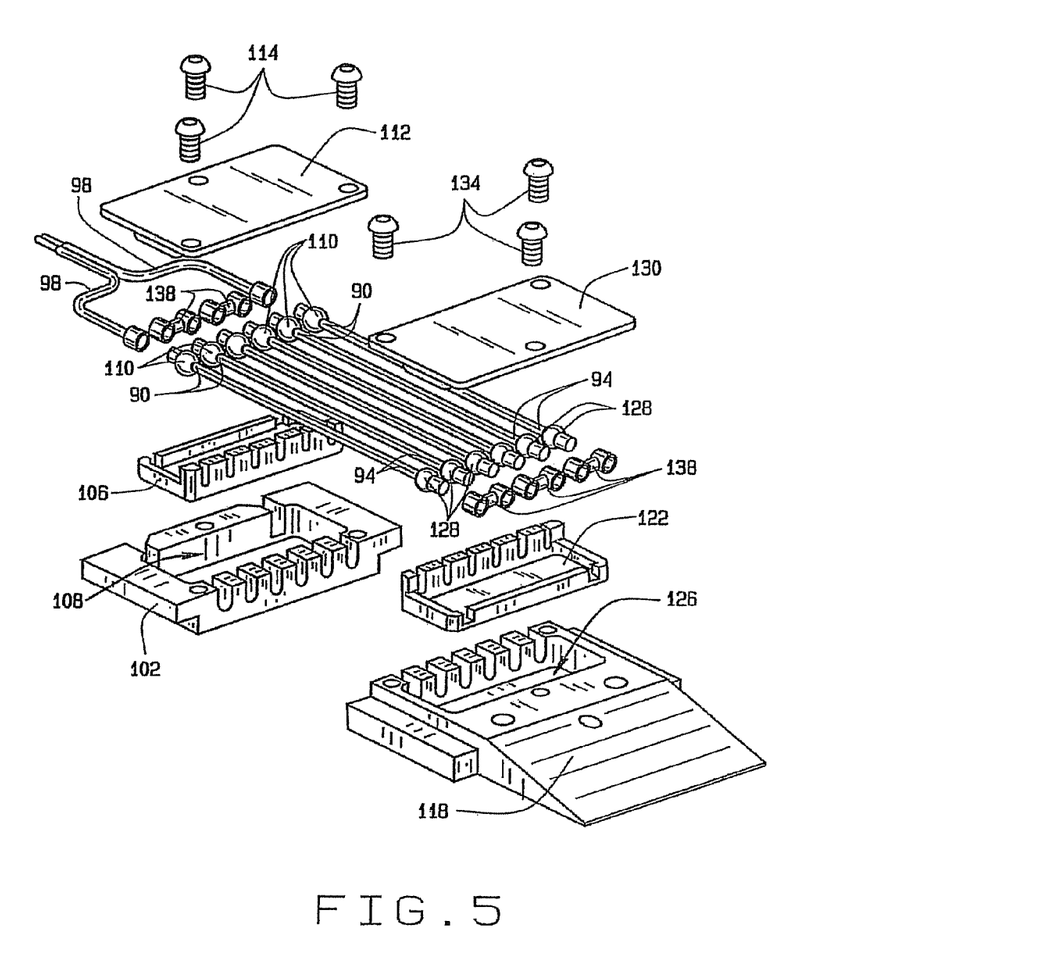
FIG. 5 is an exploded view of the actuator shown in FIG. 4.

Referring also now to FIG. 5, each SMA tendon 86 is coupled at a first end 90 to the fixed pulling bracket 74 and coupled at a second end 94 to the sliding pulling bracket 78. As described above, each SMA tendon 86 is configured to one-dimensionally constrict along the longitudinal center line X when activated by heat. The constriction of the SMA tendon(s) 86 pulls the sliding pulling bracket(s) 78 and the appending structure inner skin 34, connected to the sliding pulling bracket(s) 78, toward the fixed pulling bracket(s) 74. That is, the proximal end 54 of the appending structure inner skin 34 is pulled further into the cavity 50. Since the inner and outer skins 34 and 38 of the appending structure 28 are joined or coupled together at their respective distal end portions 62 and 66, when the inner skin 42 is pulled further into the cavity 50, the outer skin 38 is caused to turn down or bend toward the nacelle primary flow nozzle 18. Thus, the inner skin 34 slides into the cavity 50 and remains essentially flat. However, the outer skin 38 is fixed to the lip area 30 of the secondary flow nozzle 22 and therefore the distal end portion 66 of appending structure outer skin is pulled down causing the appending structure 28 to be deflected into the exhaust flow. That is, the constriction of the SMA tendon(s) 86 causes the appending structure 28 to deploy such that the appending structure 28 moves from a first position to a second position that projects into the exhaust flow from the secondary flow nozzle 22. More specifically, the constriction of the SMA tendon(s) 86 causes the appending structure 28 to deploy by changing shape from a first form to a second form. When deployed, the appending structure 28 extends into the exhaust flow, thereby altering the exhaust flow and causing it to intermix with the ambient air flowing adjacent an external side of the outer wall 46.

Thus, when heated, the SMA tendons 86 constrict in a one-dimensional linear direction, thereby causing the appending structures 28 to extend (i.e., "be deployed") at least partially into the exhaust gas flow path exiting from the secondary flow nozzle 22. In various embodiments, all of the appending structures 28 are comprehensively controlled such that all the appending structures 28 are deployed, as described above, in a substantially simultaneously manner, at the substantially the same time. Thus, when the appending structures 28 are deployed, all the appending structures, as a whole, change into a peripherally constricted state. Alternatively, each appending structure 28 could be independently controlled such that appending structures 28 could be coordinated to be deployed independent of each other, at different times, and/or to varying degrees of deployment. That is, some appending structures 28 could be deployed further into the exhaust flow than other appending structures 28.

The SMA tendons 86 have a predetermined length when secured between the fixed and sliding pulling brackets 74 and 78. When the SMA tendons 86 are not being heated, the modulus of elasticity of the appending structure outer skin 38 is greater than that of the SMA tendons 86, thus causing the SMA tendons 86 to be held taut between the fixed and sliding pulling brackets 74 and 78. This may also be referred to as the "martensitic" state of the SMA tendons 86 (i.e., the "cold" state). As described above, the SMA tendons 86 are activated by heat.

When the SMA tendons 86 experience heat the modulus of elasticity of the SMA tendons 86 increases significantly i.e., also known as its "austenitic" state. The increase in the modulus of elasticity causes the SMA tendons 86 to constrict, i.e. shorten in length, which in turn causes the appending structures 28 to deploy, i.e. bend or deform into the exhaust gas flow. In their heated condition, the modulus of elasticity of the SMA tendons 86 overcomes the modulus of elasticity of the appending structure outer skin 38, thus causing the appending structures 28 to deploy. Once the heat source is removed, the modulus of elasticity of the outer skin 38 gradually overcomes the modulus of elasticity of the SMA tendons 86 as the SMA tendons 86 cool. This effectively "pulls" the SMA tendons 86 back to their original length and returns the appending structures 28 to their non-deployed position. Thus, in various embodiments, the outer skin 38 of each appending structure 28 acts as a biasing device, i.e. a 'return spring', to return each appending structure 28 to its non-deployed positions. It should be understood that the non-deployed position is when the appending structures are positioned adjacent the exhaust flow path and not being deformed by the constriction of the SMA tendons 86 to extend into the exhaust flow path.

In one implementation, the appending structure outer skin 38 is constructed of a shape memory alloy such as NITINOL® shape memory alloy. An advantage of utilizing a super-elastic alloy is that it is extremely corrosion resistant and ideally suited for the harsh environment experienced adjacent the exhaust gas flow. Also, of significant importance is that it can accommodate the large amounts of strain required of the deformed shape.

In various embodiments, the SMA tendons 86 are heated by connecting the SMA tendons 86 to a pair of electrical wires 98 that are connected to a controllable current source (not shown). To heat the SMA tendons 86 the current source is turned on such that current flows through the wires 98 to the SMA tendons 86. The electrical resistance of the SMA tendons 86 causes the SMA tendons 86 to generate heat that in turn causes the modulus of elasticity of the SMA tendons 86 to increase significantly. As described above, the increase in the modulus of elasticity causes the SMA tendons 86 to constrict, and the appending structures 28 to deploy into the exhaust gas flow. When it is desired that the appending structures 28 no longer be deployed, the current source is turned off. This allows the SMA tendons 86 to cool so that the modulus of elasticity of the appending structures outer skins 38 gradually overcomes the modulus of elasticity of the SMA tendons 86, thereby returning the appending structures 28 to their non-deployed positions.

In various alternative embodiments, the SMA tendons 86 are heated using the exhaust gases from the secondary exhaust gas flow nozzle 22. In actual operation, the heat provided by the exhaust gases emitted from the secondary flow nozzle 22 are typically sufficient in temperature (approximately 130 degrees Fahrenheit) to produce the needed constriction of the SMA tendons 86. The actual degree of deformation may vary considerably depending upon the specific type of shape memory alloy used, as well as gauge or diameter of the SMA tendons 86. In the exemplary embodiment, wherein the structure 10 is a jet engine nacelle, when the aircraft reaches its cruising altitude, the significant drop in ambient temperature effectively acts to cool the SMA tendons 86. The cooling of the SMA tendons 86 allows the appending structure outer skin 38 to stretch the SMA tendons 86 back to their non-activated length and appending structures 28 to return to their non-deployed positions.

Referring now specifically to FIG. 5, an exploded view of an actuator 70 is illustrated in accordance with various embodiments of the present disclosure. The fixed pulling bracket 74 includes a base 102 and a retainer 106 that fits within a reservoir 108 of the fixed pulling bracket base 102. In various embodiments, the base 102 is constructed of a metal such as stainless steel. The retainer 106 is constructed of a polymer, such as acetal, to provide a layer of electrical insulation. Alternatively the retainer 106 is constructed of a ceramic material. The first end 90 of each SMA tendon 86 is retained by the retainer 106. The first ends 90 can be retained in any suitable manner, for example the first ends 90 can be screwed, riveted, welded or otherwise bonded to the retainer 106. In various embodiments, as illustrated in FIG. 5, a swaged fitting 110 is pressed onto the first end 90 of each SMA tendon 86. The swaged fittings 110 are then retained, as illustrated, within the retainer 106. Once the SMA tendons 86 are retained by the retainer 106 and the retainer 106 is placed within the reservoir 108, a cover 112 is fastened to the base 102 using fasteners 114. Preferably, the cover 112 is constructed of a polymer such as polyethylene, polypropylene or TEFLON®. The fasteners 114 can be any suitable fastener such as screws, rivets or nuts and bolts.

Similarly, the sliding pulling bracket 78 includes a base 118 and a retainer 122 that fits within a reservoir 126 of the sliding pulling bracket base 118. In various embodiments, the base 118 is constructed of a metal such as stainless steel. The retainer 122 is constructed of a polymer, such as acetal, to provide a layer of electrical insulation. The second end 94 of each SMA tendon 86 is retained by the retainer 122. The second ends 94 can be retained in any suitable manner, for example the second ends 94 can be screwed, riveted, welded or otherwise bonded to the retainer 122. In various embodiments, as illustrated in FIG. 5, a swaged fitting 128 is pressed onto the second end 94 of each SMA tendon 86. The swaged fittings 128 are then retained, as illustrated, within the retainer 122. Once the SMA tendons 86 are retained by the retainer 122 and the retainer 122 is placed within the reservoir 126, a cover 130 is fastened to the base 118 using fasteners 134. Preferably, the cover 130 is constructed of a polymer such as polyethylene, polypropylene or TEFLON®. The fasteners 134 can be any suitable fastener such as screws, rivets or nuts and bolts.

Additionally, in the embodiment wherein the SMA tendons 86 are heated utilizing an electrical current source, one of the wires 98 is connected to the first end of one SMA tendon 86 and the other wire 98 is connected to the first end of a separate SMA tendon 86 within the same actuator 70. The two SMA tendons 86 connected to the wires 98, and any other SMA tendons 86 within the same actuator 70, are electrically coupled together using jumpers 138. Therefore, current provided by the current source will travel through each SMA tendon 86 included in the actuator 70, and thereby activate each SMA tendon 86 as described above. In the case where an actuator 70 included only one SMA tendon 86, one of the wires 98 would be connected to the first end 90 of the SMA tendon 86 and the other wire 98 would be connected to the opposing second end 94 of the SMA tendon 86.

Figure 6:
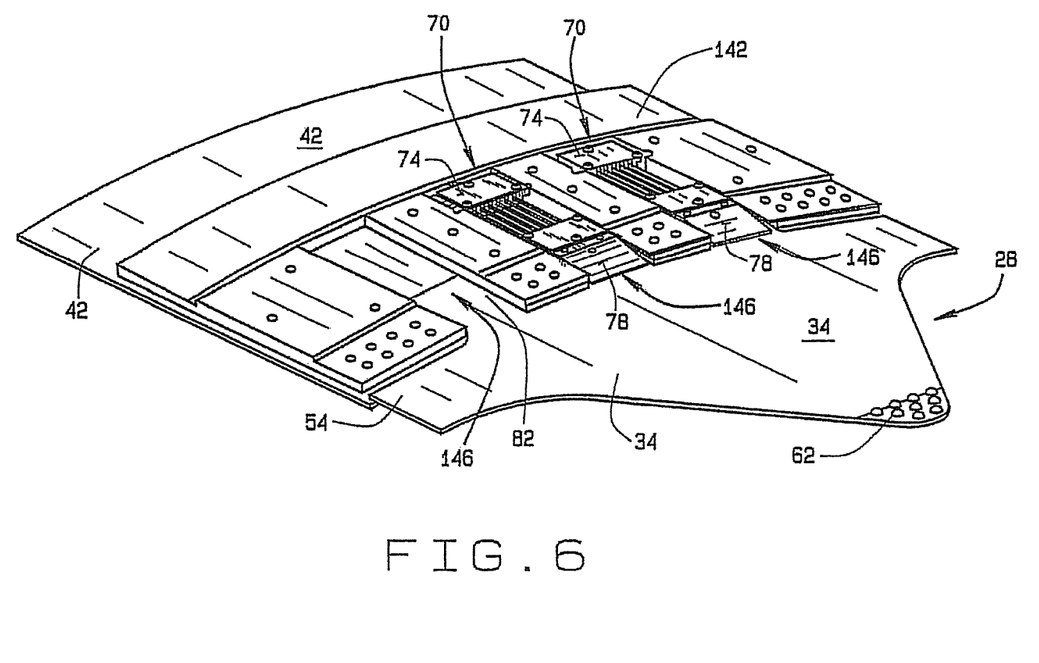
FIG. 6 is a partial view of the portion of the nacelle secondary nozzle main body and appending structure, as shown in FIG. 2, with an outer wall of the main body and an outer skin of the appending structure removed to illustrate an actuator guide, in accordance with various embodiments of the present disclosure.

Referring now to FIG. 6, a partial view of the portion of the nacelle secondary nozzle main body 26 and appending structures 28, as shown in FIG. 2, is illustrated with the outer wall 46 of the main body 26 and the outer skin 38 of the appending structure 28 removed. An actuator guide plate 142 is affixed to the main body inner wall 42 using any suitable fastening means, such as screws, rivets, welding or diffusion bonding. The actuator guide plate 142 includes guide channels 146 that are adapted to guide the sliding pulling bracket 78 when the SMA tendons 86 are activated. The actuators 70 are positioned and fitted within the guide channels 146 in a 'slip-fit' manner. This allows the sliding pulling brackets 78 to slide toward the fixed pulling brackets 74 while guiding the movement of sliding pulling brackets 78 such that the appending structure inner skin 34 is moved toward the fixed pulling brackets in a substantially straight line. Therefore, the sliding pulling brackets 78 are not allowed to vary their movement and the appending structures 28 are deployed with accuracy and consistency.

Figure 7:
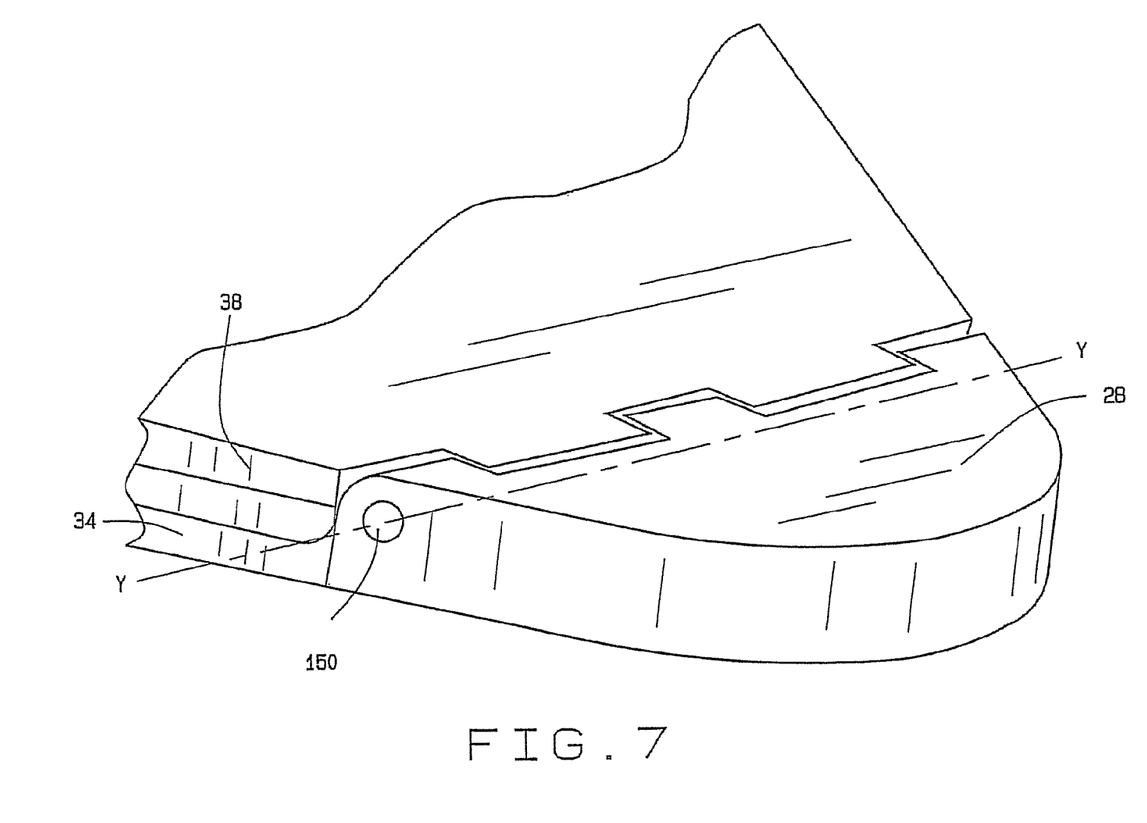
FIG. 7 is an illustration of various alternate embodiments of distal ends of the appending structure inner and outer skins, whereby the distal ends are joined utilizing an hinge device.

FIG. 7 illustrates the appending structure 28 inner and outer skins 34 and 38 joined at the respective distal portions 62 and 66 using a hinge device 150. As described above, the distal end portions 62 and 66 of the appending structure inner and outer skins 34 and 38 are joined together. Therefore, when the actuators 70 are activated, the inner skin 34 is pulled further into the cavity 50 causing the outer skin 38 to turn down or bend, more particularly, causing the appending structure 28 to deploy. In various embodiments the distal portions 62 and 66 are hingedly coupled via the hinge device 150. The hinge device 150 can be any suitable hinged device that pivots along a line Y that is substantially parallel to an aft edge 152, shown in FIG. 2, of the nacelle secondary nozzle main body 22.

Figure 8:
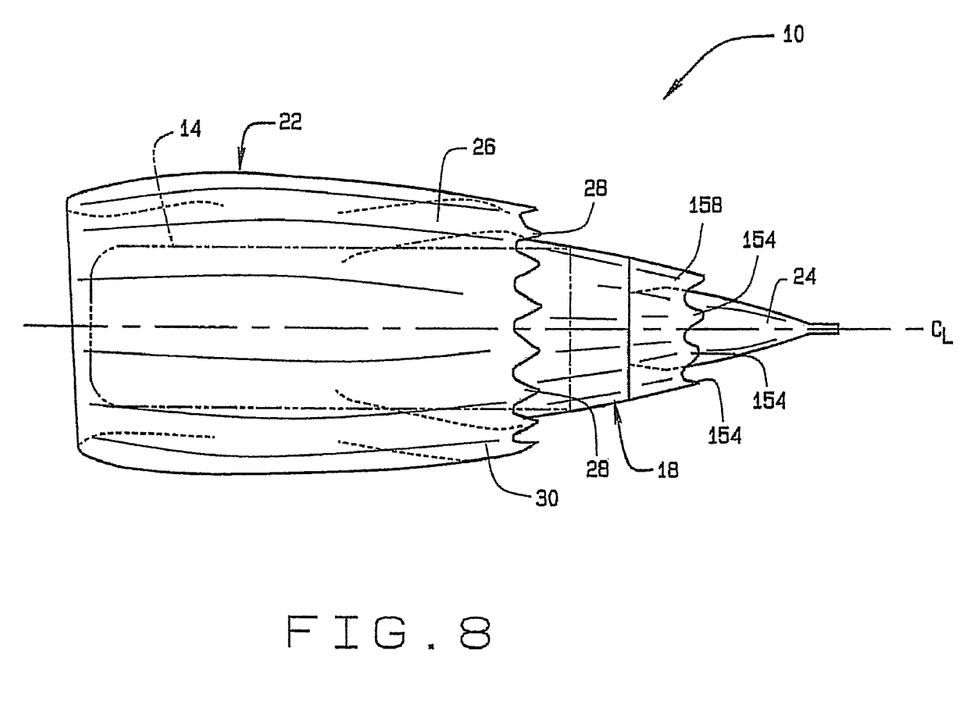
FIG. 8 is a simplified side view of the nacelle shown in FIG. 1 in accordance with other embodiments of the present disclosure.

Referring to FIG. 8, in further description of the exemplary embodiment wherein the structure 10 is a jet engine nacelle, another preferred embodiment will be described wherein the primary flow nozzle 18 includes a plurality of appending structures 154. The appending structures 154 extend from a lip area 158 of the primary flow nozzle 18. SMA actuators (not shown) that are substantially identical to the SMA actuators 70 described above, are attached to the appending structures 154 in the same manner as described above with reference to the nacelle secondary nozzle 22. Therefore, the appending structures 154 and associated SMA actuators and SMA tendons (not shown) that are utilized to deploy the appending structures 154, are essentially the same in form and function as the appending structures 154 and associated SMA actuators 70 and SMA tendons 86, described above with reference to FIGS. 1-7.

However, the appending structures 154 deploy to increase the mixing of core exhausts, i.e. turbine exhaust, with the ambient air and/or by-pass fan exhaust. Accordingly, the appending structures 154 are constructed of a high temperature material, such as titanium. Thus, although the above description of the present disclosure with respect to appending structures 28 will not be repeated with reference to appending structures 154, it should be understood that appending structures 154 are deployed utilizing SMA actuators and tendons in essentially the identical manner as described above with reference to appending structures 28. Furthermore, it should be understood that FIGS. 1-7 and the related description set forth above can be used to describe the present disclosure with reference to both appending structures 28 and 154, with the understanding that the appending structures 154 are associated with the primary flow nozzle 18 while the appending structures 28 are associated with the secondary flow nozzle 22.

The various embodiments described herein thus provide a structure that includes a body having a first wall and a second wall, at least one appending structure extending from an end of the body. At least one SMA actuator is positioned between the first and second walls. The SMA actuator includes first end coupled to a portion of the body and a second end coupled to a portion of the appending structure. At least one SMA tendon is connected to and extends between the first and second ends of the SMA actuator. The SMA tendon(s) is/are adapted to controllably constrict when activated by heat to cause the appending structure to move from a first position or form to a second position or form. Therefore, the shape or position of the appending structure is dynamically altered without complex kinematic mechanisms or the use of bulky actuators that occupy excessive space and add considerable costs and weight.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification and following claims.

What is claimed is:

1. A method of controlling mixing of a flow exiting a downstream end of a primary nozzle associated with a jet engine, the method comprising:
coupling a shape memory alloy (SMA) element to a mixing structure disposed at the downstream edge of said primary nozzle comprises;
coupling a plurality of SMA elements to a plurality of mixing structures arranged circumferentially about said downstream end of said primary nozzle; and
coupling each of said plurality of SMA elements between a fixedly mounted pulling bracket and a slidable pulling bracket, with the slidable pulling bracket being operably associated with each of said plurality of mixing structures;
applying an electrical signal to said SMA element to heat said SMA element and induce a phase change in said SMA element;

said phase change causing an axial length of said SMA element to constrict, to cause movement of said mixing structure into a path of said flow exiting said primary nozzle.

2. The method of claim 1, wherein said phase change of said SMA element to cause movement of said mixing structure comprises using said SMA element to cause said mixing structure to flex into the path of said flow exiting said primary nozzle.

3. The method of claim 1, wherein said phase change of said SMA element to cause movement of said mixing structure comprises using said SMA element to cause a pivoting movement of said mixing structure into said flow exiting said primary nozzle.

4. The method of claim 1, wherein said coupling an SMA element to a mixing structure comprise coupling a plurality of SMA tendons arranged parallel to one another, to said mixing structure.

5. A method of controlling mixing of a flow exiting a downstream end of a primary nozzle associated with a jet engine, the method comprising:
coupling a shape memory alloy (SMA) element to a mixing structure disposed at the downstream edge of said primary nozzle;
coupling a first portion of said SMA element to a fixed pulling bracket and a coupling a second portion of said SMA element to a moveable pulling bracket;
applying a signal to said SMA element to that causes a phase change in said SMA element, thus changing its axial length; and
using said change in axial length of said SMA element to pivot said mixing structure into a path of said flow exiting said primary nozzle.

6. The method of claim 5, wherein said change in axial length of SMA element comprises a reduction in the axial length of said SMA element.

7. The method of claim 5, wherein said using said change in axial length of said SMA element to pivot said mixing structure comprises coupling a portion of a hinge device to a portion of said mixing structure, and using said hinge device to enable pivoting motion of the mixing structure.

8. The method of claim 5, wherein said applying a signal to said SMA element comprises applying an electrical signal to said SMA element.

9. The method of claim 5, further comprising:
coupling a plurality of said SMA elements in a circumferential arrangement around said primary nozzle;
coupling a plurality of said mixture structures to said plurality of said SMA elements;
simultaneously applying a plurality of said signals to said SMA elements to cause each one of said plurality of said SMA elements to change its length, to thus cause each one of said SMA elements to be pivoted into said path of said flow exiting said nozzle.

10. The method of claim 5, wherein said coupling said SMA element to said mixing structure comprises coupling a plurality of SMA tendons arranged parallel to one another, to said mixing structure.

11. The method of claim 5, wherein said coupling a second portion of said SMA element to a moveable pulling bracket comprises coupling said second portion of said SMA element to a slidable pulling bracket.

12. A method of controlling mixing of a flow exiting a downstream end of a primary nozzle associated with a jet engine, the method comprising:
coupling a shape memory alloy (SMA) element to a mixing structure disposed at the downstream edge of said primary nozzle comprises:
coupling a first portion of said SMA element to a fixed pulling bracket and a coupling a second portion of said SMA element to a moveable pulling bracket;
applying a signal to said SMA element to that causes a phase change in said SMA element, thus changing a dimensional property of said SMA element; and
using said change in dimensional property of said SMA element to flex said mixing structure into a path of said flow exiting said primary nozzle.

13. The method of claim 12, wherein said applying a signal to said SMA element comprises applying an electrical signal to said SMA element.

14. The method of claim 12, wherein said changing a dimensional property of said SMA element comprises shortening an axial length of said SMA element.

15. The method of claim 12, further comprising arranging a plurality of said SMA elements circumferentially around said downstream edge of said primary nozzle, and coupling said plurality of SMA elements to a corresponding plurality of said mixing structures.

16. The method of claim 15, further comprising applying a plurality of said signals to said plurality of SMA elements.

17. The method of claim 12, wherein said coupling an SMA element comprises coupling a plurality of SMA tendons arranged parallel to one another, to said mixing structure.

\* \* \* \* \*